United States Patent
Crutchfield (10) Patent No.: US 10,557,365 B2
(45) Date of Patent: Feb. 11, 2020

(54) CERAMIC MATRIX COMPOSITE BLADE TRACK WITH MOUNTING SYSTEM HAVING REACTION LOAD DISTRIBUTION FEATURES

(71) Applicant: Rolls-Royce Corporation, Indianapolis, IN (US)

(72) Inventor: Jeffrey M. Crutchfield, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 135 days.

(21) Appl. No.: 15/725,488

(22) Filed: Oct. 5, 2017

(65) Prior Publication Data

US 2019/0107001 A1 Apr. 11, 2019

(51) Int. Cl.
*F01D 11/08* (2006.01)
*F01D 25/00* (2006.01)
*F01D 25/24* (2006.01)

(52) U.S. Cl.
CPC ............ *F01D 11/08* (2013.01); *F01D 25/005* (2013.01); *F01D 25/246* (2013.01); *F05D 2220/32* (2013.01); *F05D 2240/11* (2013.01); *F05D 2250/75* (2013.01); *F05D 2300/6033* (2013.01)

(58) Field of Classification Search
CPC ........ F01D 11/08; F01D 25/005; F01D 11/12; F01D 11/18; F05D 2220/32; F05D 2240/11; F05D 2250/75
USPC ...................................................... 415/173.1
See application file for complete search history.

(56) References Cited

U.S. PATENT DOCUMENTS

| | | |
|---|---|---|
| 2,834,537 A | 5/1958 | Neary |
| 2,925,290 A | 2/1960 | Greenwald |
| 4,759,687 A | 7/1988 | Miraucourt et al. |
| 4,841,726 A | 6/1989 | Burkhardt |
| 4,875,828 A | 10/1989 | Willkop et al. |
| 4,934,900 A | 6/1990 | Schonbach et al. |
| 5,141,395 A | 8/1992 | Carroll et al. |
| 5,169,287 A | 12/1992 | Proctor et al. |
| 5,180,281 A | 1/1993 | Burge et al. |
| 5,272,869 A | 12/1993 | Dawson et al. |
| 5,288,206 A | 2/1994 | Bromann et al. |
| 5,320,486 A | 6/1994 | Walker et al. |
| 5,522,705 A | 6/1996 | Elaini et al. |
| 5,957,067 A | 9/1999 | Dobbeling et al. |

(Continued)

FOREIGN PATENT DOCUMENTS

| | | |
|---|---|---|
| EP | 171329 A1 | 2/1986 |
| EP | 1965030 A2 | 9/2008 |

(Continued)

OTHER PUBLICATIONS

Extended European Search Report, European Application No. 18194333.3-1006, dated Mar. 11, 2019, 8 pages.

*Primary Examiner* — Nathaniel E Wiehe
*Assistant Examiner* — David Whittaker
(74) *Attorney, Agent, or Firm* — Barnes & Thornburg LLP (57) ABSTRACT

An assembly adapted for use in a gas turbine engine has a carrier component and a supported component. The assembly includes a mounting system for coupling the supported component to the carrier component. In an illustrative embodiment, the assembly is a turbine shroud segment for blocking gasses from passing over turbine blades included in the gas turbine engine.

18 Claims, 4 Drawing Sheets

(56) References Cited

U.S. PATENT DOCUMENTS

| | | |
|---|---|---|
| 5,971,703 A | 10/1999 | Bouchard |
| 6,062,813 A | 5/2000 | Halliwell et al. |
| 6,382,905 B1 | 5/2002 | Czachor et al. |
| 6,543,995 B1 | 4/2003 | Honda et al. |
| 6,575,697 B1 | 6/2003 | Arilla et al. |
| 6,602,050 B1 | 8/2003 | Scheurlen et al. |
| 6,655,696 B1 | 12/2003 | Fang et al. |
| 6,733,235 B2 | 5/2004 | Alford et al. |
| 6,884,026 B2 | 4/2005 | Glynn et al. |
| 6,904,757 B2 | 6/2005 | Mitchell et al. |
| 6,932,566 B2 | 8/2005 | Suzumura et al. |
| 6,942,203 B2 | 9/2005 | Schroder et al. |
| 6,969,236 B2 | 11/2005 | Giesler et al. |
| 7,001,493 B1 | 2/2006 | Kim |
| 7,052,235 B2 | 5/2006 | Alford et al. |
| 7,056,053 B2 | 6/2006 | Schilling et al. |
| 7,066,470 B2 | 6/2006 | Turnquist et al. |
| 7,094,029 B2 | 8/2006 | Taylor et al. |
| 7,114,920 B2 | 10/2006 | Synnott |
| 7,229,246 B2 | 6/2007 | Ghasripoor et al. |
| 7,237,389 B2 | 7/2007 | Ryan et al. |
| 7,494,317 B2 | 2/2009 | Keller et al. |
| 7,546,743 B2 | 6/2009 | Bulman et al. |
| 7,614,848 B2 | 11/2009 | Bogue et al. |
| 7,726,936 B2 | 6/2010 | Keller et al. |
| 8,047,779 B2 | 11/2011 | Roy et al. |
| 8,122,727 B2 | 2/2012 | Shi et al. |
| 8,133,013 B2 | 3/2012 | Audeon et al. |
| 8,303,246 B2 | 11/2012 | Drelon et al. |
| 8,430,629 B2 | 4/2013 | Turi et al. |
| 8,454,023 B2 | 6/2013 | Samudrala et al. |
| 8,834,105 B2 | 9/2014 | Albers et al. |
| 8,973,375 B2 | 3/2015 | O'Leary |
| 9,039,358 B2 | 5/2015 | Tholen et al. |
| 9,080,463 B2 | 7/2015 | Denece et al. |
| 9,127,569 B2 | 9/2015 | Akiyama et al. |
| 9,249,684 B2 | 2/2016 | Lazur et al. |
| 9,593,596 B2 | 3/2017 | Uskert et al. |
| 9,726,043 B2 | 8/2017 | Franks et al. |
| 9,759,082 B2 | 9/2017 | Thomas et al. |
| 9,845,692 B2 | 12/2017 | Jamison |
| 9,915,153 B2 | 3/2018 | Sener |
| 9,938,846 B2 | 4/2018 | Freeman et al. |
| 10,041,369 B2 | 8/2018 | Blaney et al. |
| 10,054,232 B2 | 8/2018 | Seaton |
| 10,100,649 B2 | 10/2018 | Thomas |
| 10,138,746 B2 | 11/2018 | McMahon |
| 10,184,356 B2 | 1/2019 | McCaffrey |
| 10,208,614 B2 | 2/2019 | Hafner et al. |
| 10,215,056 B2 | 2/2019 | Sippel et al. |
| 2004/0188947 A1 | 9/2004 | Paprotna |
| 2006/0067815 A1 | 3/2006 | Ghasripoor et al. |
| 2008/0178465 A1 | 7/2008 | Schiavo et al. |
| 2009/0110546 A1 | 4/2009 | Tholen et al. |
| 2009/0123278 A1 | 5/2009 | Audeon et al. |
| 2012/0027572 A1 | 2/2012 | Denece et al. |
| 2012/0248704 A1 | 10/2012 | Fennell et al. |
| 2014/0127457 A1 | 5/2014 | Hillier |
| 2014/0147266 A1 | 5/2014 | Kramer |
| 2015/0377050 A1 | 12/2015 | Freeman et al. |
| 2016/0102572 A1* | 4/2016 | O'Leary .................. F01D 11/12 415/173.1 |
| 2016/0169038 A1 | 6/2016 | Weaver et al. |
| 2016/0186999 A1 | 6/2016 | Freeman et al. |
| 2016/0201910 A1* | 7/2016 | Chang ..................... F01D 11/08 60/753 |
| 2016/0290140 A1 | 10/2016 | Thomas et al. |
| 2016/0290145 A1 | 10/2016 | Roussille et al. |
| 2016/0333715 A1 | 11/2016 | McCaffrey |
| 2017/0101882 A1* | 4/2017 | Sippel ..................... F01D 11/08 |
| 2017/0130600 A1 | 5/2017 | Shapiro et al. |
| 2017/0260869 A1 | 9/2017 | Vetters et al. |
| 2017/0260877 A1* | 9/2017 | King ..................... F01D 25/243 |
| 2018/0051581 A1* | 2/2018 | Quennehen ............. F01D 11/08 |
| 2018/0106160 A1 | 4/2018 | Thomas et al. |
| 2018/0149030 A1 | 5/2018 | Freeman et al. |
| 2018/0149041 A1 | 5/2018 | Freeman et al. |
| 2018/0149042 A1* | 5/2018 | Freeman ............... F01D 11/005 |
| 2018/0156068 A1 | 6/2018 | Roussille et al. |
| 2018/0328208 A1 | 11/2018 | O'Leary et al. |

FOREIGN PATENT DOCUMENTS

| | | |
|---|---|---|
| EP | 3037628 A1 | 6/2016 |
| EP | 3075965 A1 | 10/2016 |
| EP | 3309366 A1 | 4/2018 |
| EP | 3330497 A1 | 6/2018 |
| WO | 1999031414 A1 | 6/1999 |
| WO | 2014186099 A1 | 11/2014 |
| WO | 2018172655 A1 | 9/2018 |

* cited by examiner

CERAMIC MATRIX COMPOSITE BLADE TRACK WITH MOUNTING SYSTEM HAVING REACTION LOAD DISTRIBUTION FEATURES

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional fasteners such as rivets or bolts may present problems due to thermal expansion and/or material properties of the ceramic matrix composite components.

SUMMARY

The present disclosure may comprise one or more of the following features and combinations thereof.

According to the present disclosure, a turbine shroud segment adapted for use in a gas turbine engine includes a carrier segment, a blade track segment, and a mounting system configured to couple the blade track segment to the carrier segment. The carrier segment is made from metallic materials while the blade track segment is made from ceramic matrix composite materials. The blade track segment is formed to include a runner shaped to extend partway around a central axis and an attachment portion that extends radially outward from the runner.

In illustrative embodiments, the mounting system includes a brace formed to include a bracket that engages the attachment portion of the blade track segment and a threaded shaft that extends from the bracket through the carrier segment to couple the blade track segment to the carrier segment. The bracket of the brace includes a support body, a track location arm, and a load-reaction arm. The threaded shaft extends from the support body of the bracket. The track-location arm engages the attachment portion of the blade track segment and provides rigid loading points for the blade track segment. The load-reaction arm that engages the carrier segment. The load-reaction arm is arranged to carry reaction loads induced when pressure is applied to push the blade track segment radially inward toward the central axis during use of the turbine shroud segment in a gas turbine engine.

In illustrative embodiments, the track-location arm includes a cantilevered boom that extends axially in a first direction from the support body and the load-reaction arm includes a cantilevered boom that extends axially in a second direction, opposite the first direction, from the support body. The track-location arm includes a plurality of engagement pads that extend radially from the cantilevered boom of the track-location arm at a location spaced apart from the support body and that directly contact a radially-inwardly facing surface of the attachment portion of the blade track segment. The plurality of engagement pads of the track-location arm include two circumferentially spaced apart engagement pads.

In illustrative embodiments, the load-reaction arm includes an engagement pad that extends radially from the cantilevered boom of the load-reaction arm at a location spaced apart from the support body and that directly contacts a radially-inwardly facing surface of the carrier segment. The engagement pad of the load-reaction arm is axially spaced apart from the support body.

In illustrative embodiments, the threaded shaft extends radially outward from the support body. The track-location arm extends axially from the support body at a location arranged radially inward of the load-reaction arm.

In illustrative embodiments, the mounting system includes a second brace formed to include a bracket that engages the attachment portion of the blade track segment and a threaded shaft that extends from the bracket through the carrier segment to couple the blade track segment to the carrier segment. The bracket of the second brace includes a support body from which the threaded shaft extends, a track-location arm that engages the attachment portion of the blade track segment and provide rigid loading points for the blade track segment, and a load-reaction arm that engages the carrier segment. The load-reaction arm is arranged to carry reaction loads induced when pressure is applied to push the blade track segment radially inward during use of the turbine shroud segment in a gas turbine engine.

In illustrative embodiments, the track-location arm included in each of the brace and the second brace has a cantilevered boom that extends axially in a first direction from the support body. The load-reaction arm included in each of the brace and the second brace has a cantilevered boom that extends axially in a second direction, opposite the first direction, from the support body. In some embodiments, the second brace is located on an axially opposite side of the attachment portion of the blade track segment than the brace.

In illustrative embodiments, the threaded shaft included in each of the brace and the second brace extends radially outward from the support body, and wherein the track-location arm included in each of the brace and the second brace extends axially from the support body at a location arranged radially inward of the load-reaction arm.

In illustrative embodiments, the attachment portion of the blade track segment has a T-shape when viewed in the circumferential direction with a stem that extends radially outward from the runner and an attachment panel that extends radially forward and aft from the stem. Accordingly, the entire blade track segment has a generally I-beam shape when viewed in the circumferential direction. The track-location arms engage a radially-inwardly facing surface of the attachment panel included in the blade track segment.

According to another aspect of the present disclosure, a turbine shroud adapted for use in a gas turbine engine includes a carrier component, a blade track segment, and a mounting system configured to couple the blade track segment to the carrier component. The carrier component comprises metallic materials, while the blade track segment comprises ceramic matrix composite materials. The blade track segment is formed to include a runner shaped to extend partway around a central axis and an attachment portion that extends radially outward from the runner away from the central axis.

In illustrative embodiments, the mounting system includes a plurality of braces and a plurality of threaded nuts engaged with the braces. Each brace includes a threaded shaft that extends through the carrier component, a track-location arm that extends axially forward or aft of the threaded shaft and engages the attachment portion of the blade track segment, and a load-reaction arm that extends axially forward or aft of the threaded shaft, opposite of the track-location arm, and engages the carrier component.

In illustrative embodiments, the track-location arm includes a cantilevered boom that extends from a support body included in the brace and a plurality of engagement pads that extend radially outward from the cantilevered boom of the track-location arm into direct contact with the blade track segment. The plurality of engagement pads included in the track-location arm includes two circumferentially spaced apart pads.

In illustrative embodiments, the attachment portion of the blade track segment has a T-shape when viewed in the circumferential direction with a stem that extends radially outward from the runner and an attachment panel that extends radially forward and aft from the stem. Accordingly, the entire blade track segment has a generally I-beam shape when viewed in the circumferential direction. The track-location arms engage a radially-inwardly facing surface of the attachment panel included in the blade track segment. Some of the plurality of braces are located along an axially forward side of the attachment panel included in the attachment portion of the blade track segment and some of the plurality of braces are located along an axially aft side of the attachment panel included in the attachment portion of the blade track segment.

According to another aspect of the present disclosure, an assembly includes a carrier component, a supported component, and a mounting system configured to couple the supported component to the carrier component. The carrier component comprises metallic materials, while the supported component comprises ceramic matrix composite materials. The supported component is formed to include a shield portion adapted to face a hot environment when the assembly is in use and an attachment portion that extends from the shield portion.

In illustrative embodiments, the mounting system includes a plurality of braces and a plurality of threaded nuts engaged with the braces. Each brace includes a threaded shaft that extends through the carrier component, a track-location arm that engages the attachment portion of the supported component, and a load-reaction arm that engages the carrier component.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
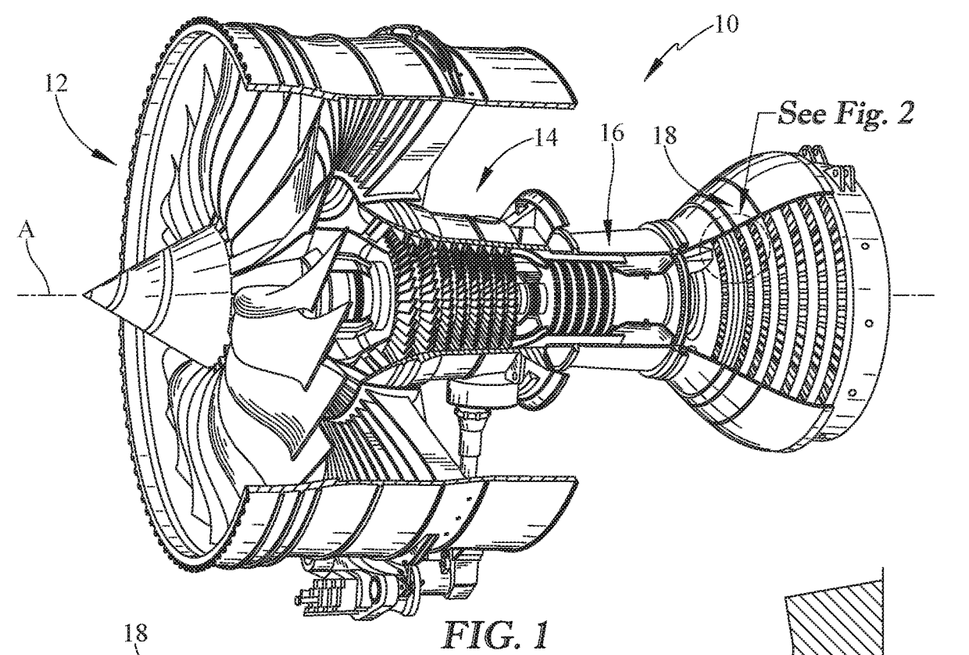
FIG. 1 is a cut-away perspective view of a gas turbine engine showing that the exemplary engine includes a fan driven by an engine core having a compressor, a combustor, and a turbine.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
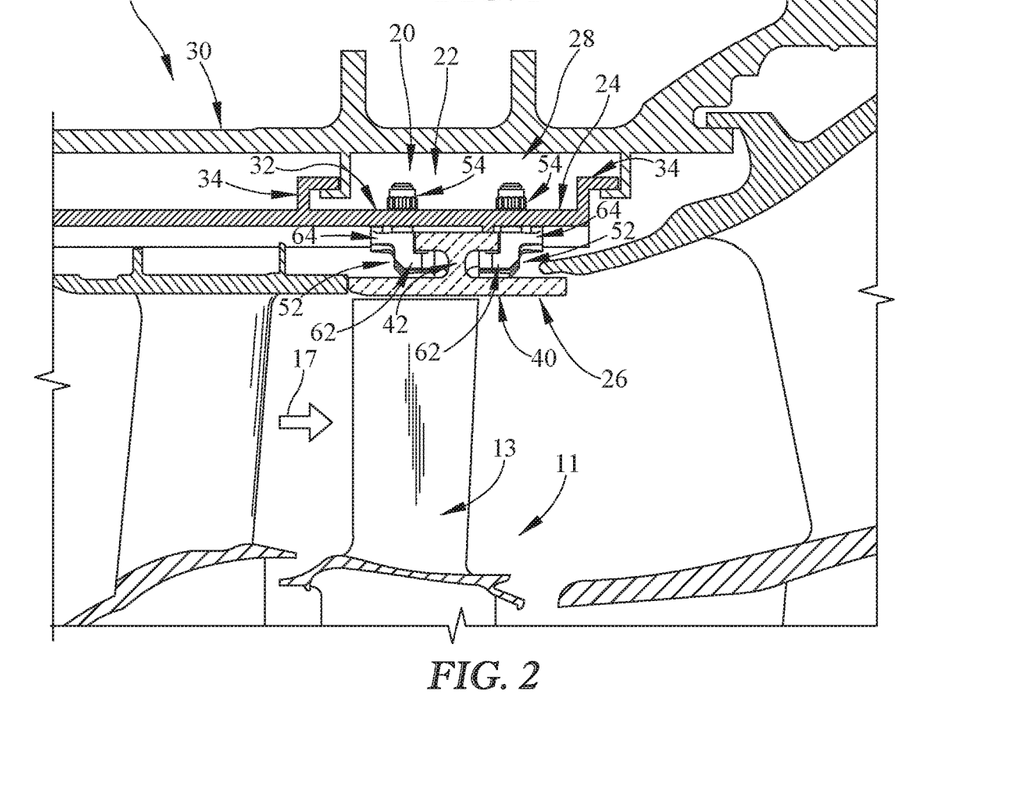
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
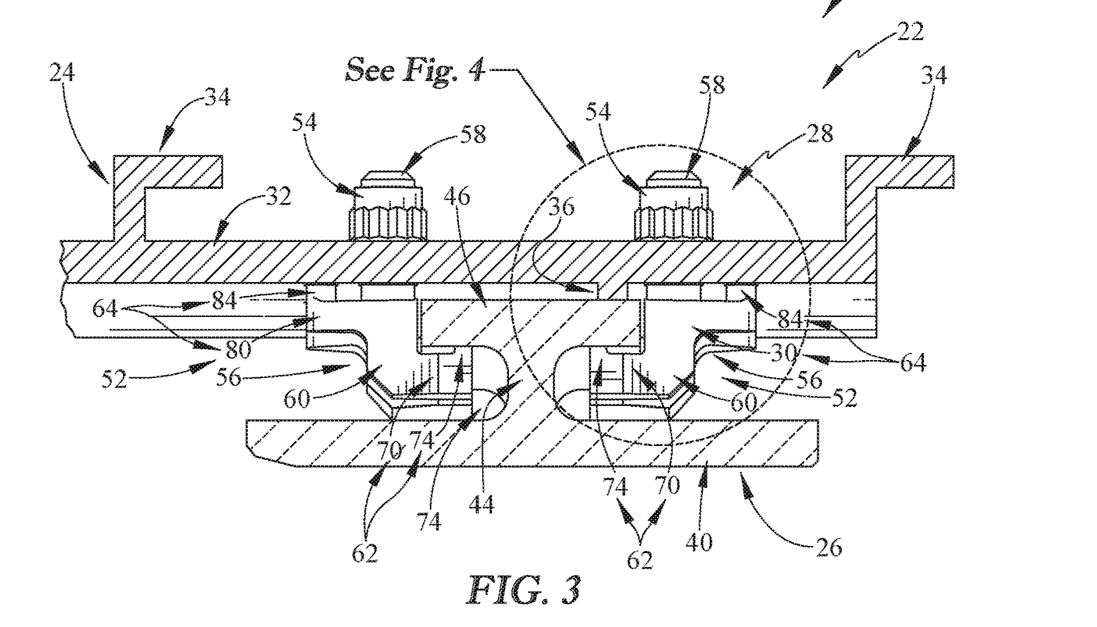
FIG. 3 is a detail view of a portion of FIG. 2 showing a turbine shroud segment that includes a carrier segment, a blade track segment, and a mounting system for coupling the blade track segment to the carrier segment, and showing that the mounting system includes a plurality of braces that engage the blade track segment and that have a threaded stud that extends to the carrier segment.
Figure 4:
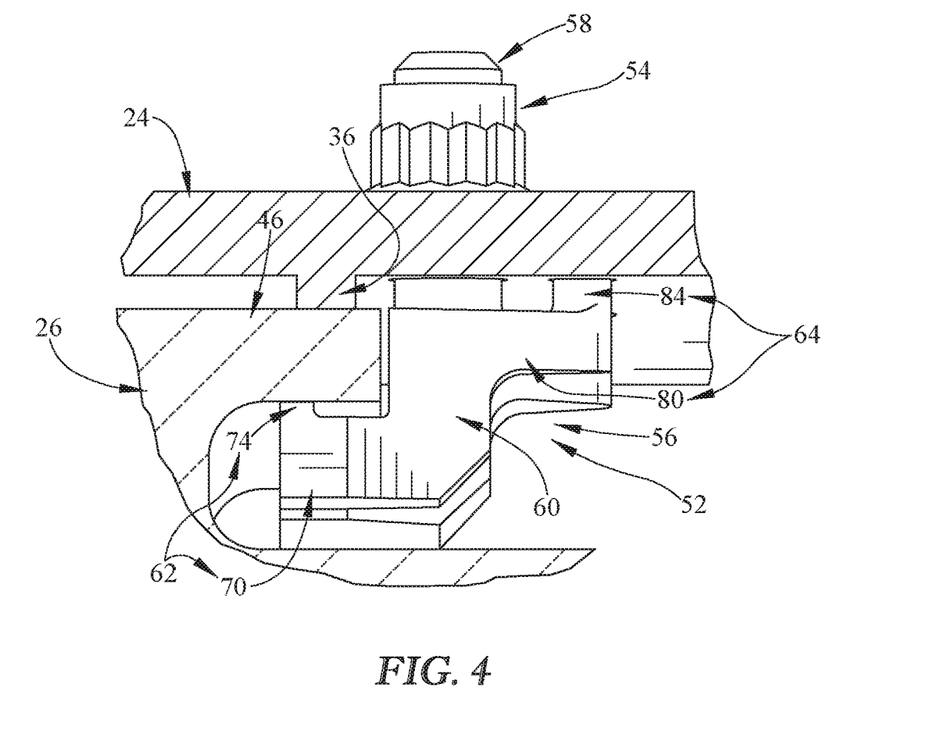
FIG. 4 is a further detail view of a portion of FIG. 3 showing that each of the braces has a bracket that extends from the threaded stud and that is formed to include track-location arms that engage the blade track segment and a load-reaction arm that engages the carrier segment to carry reaction loads induced on the bracket and thereby manage bending moment loads applied to the threaded stud when pressure in the engine is applied to the blade track segment.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that extend only part-way around the central axis A and cooperate to surround the turbine wheel assembly 11. The shroud segments 22 are sealed against one another, such as by strip seal members, to provide a continuous turbine shroud 20. In other embodiments, the turbine shroud 20 is annular and non-segmented to extend fully around the central axis A and surround the turbine wheel assembly 11. In yet other embodiments, certain components of the turbine shroud 20 are segmented while other components are annular and non-segmented.

Each shroud segment 22 includes a carrier segment 24, a blade track segment 26, and a mounting system 28 configured to couple the blade track segment 26 to the carrier segment 24 as shown in FIGS. 3 and 4. The carrier segment 24 is a metallic support component configured to interface with other metallic components spaced from the primary gas path of the engine 10. The blade track segment 26 is a ceramic matrix composite component configured to directly face the high temperatures of the primary gas path. The mounting system 28 is designed to engage the blade track segment 26 so as to distribute mounting and pressure loads so that threaded shafts (or studs) 58 included in the mounting system 28 are not exposed to undesired bending moments.

The carrier segment 24 included in each shroud segment 22 is coupled to an outer case 30 of the engine 10 as shown in FIG. 2. Each carrier segment 24 illustratively includes a body plate 32, hangers 34, and locating pads 36 as shown in FIG. 3. The body plate 32 extends partway around the axis 11 and is formed to include holes 35 through which the mount system 28 extends. The hangers 34 extend radially outward from the body plate 32 and engage the outer case 30 to couple the turbine shroud segment 22 to the rest of the engine 10. Three locating pads 36 extend radially inward from the body plate 32 and contact the blade track segment 26 to help locate the blade track segment 26 relative to the carrier segment 24. The locating pads 36 may be machined to help place the blade track segment 26 in a desired orientation relative to the carrier segment 24.

The blade tracks segment 26 of each shroud segment 22 comprises ceramic matrix composite materials as suggested in FIGS. 2 and 4. The blade track segment 26 is held in place adjacent to tips of turbine blades 13 to block combustion products from passing over the blades 13 without pushing the blades 13 to rotate as suggested in FIG. 2. The blade track segment 26 is illustratively formed to include a runner 40 and an attachment 42. The runner 40 arcuate and extends partway around axis 11 adjacent to turbine blades 13. The attachment 42 extends radially outward from the runner 40 to provide structure for coupling the blade track segment 26 to the carrier segment 24.

In the illustrative embodiment, the attachment 42 of the blade track segment 26 has a T-shape when viewed in the circumferential direction as such that the entire blade track segment has a generally I-beam shape when viewed in the circumferential direction shown in FIGS. 3 and 4. The attachment (or attachment portion) 42 includes a stem 44 that extends radially outward from the runner 40 and an attachment panel 46 that extends radially forward and aft from the stem 44. In other embodiments, the attachment 42 may be provided by L-shaped hangers, fir-tree shaped members, dovetail members, box shape panels, or other suitable features.

Figure 5:
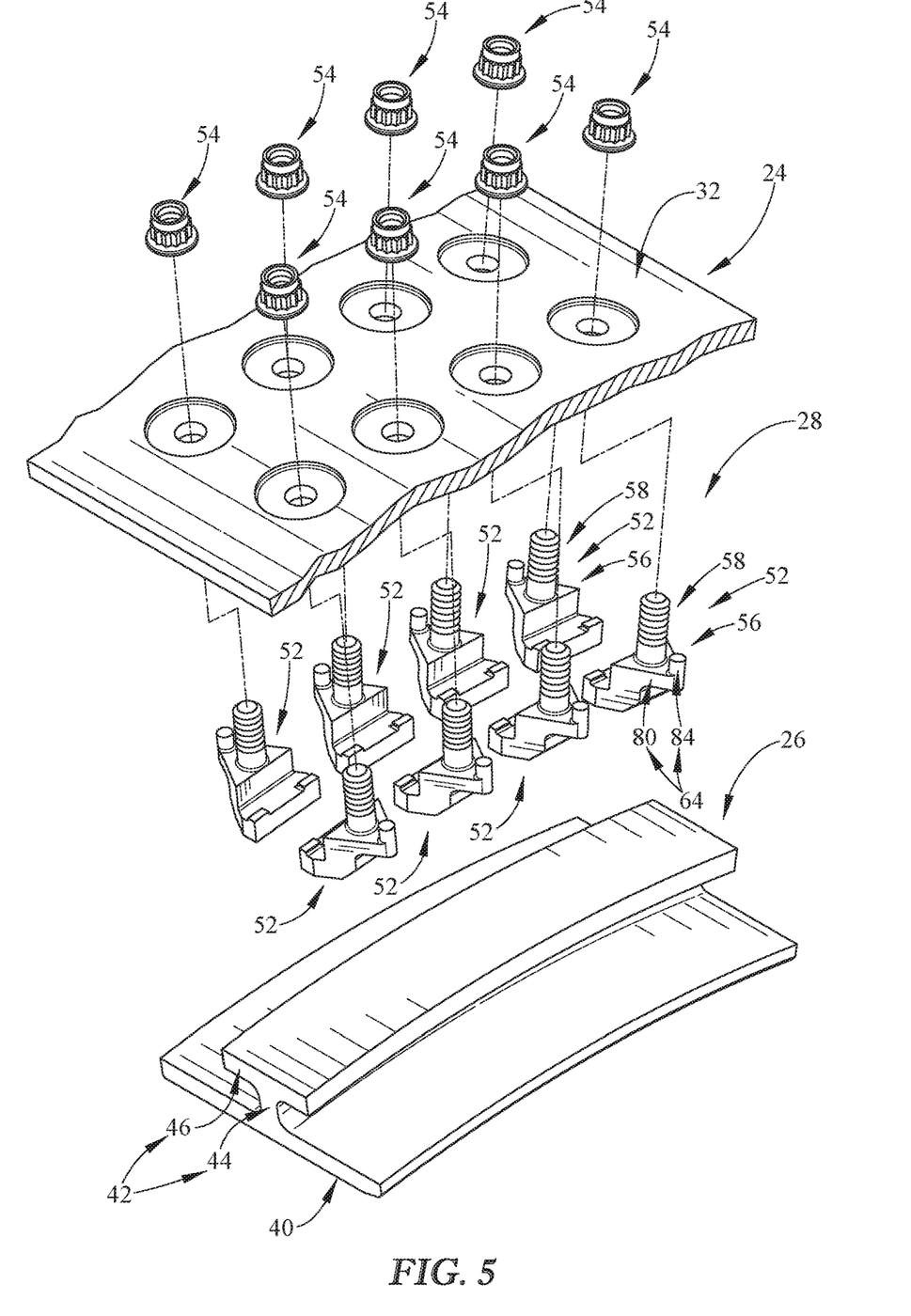
FIG. 5 is an exploded perspective assembly view of the turbine shroud segment of FIGS. 3 and 4 showing that the mounting system includes a plurality of braces each having a threaded shaft and a bracket that engages the blade track segment.

Turning again to the mounting system 28, the system 28 includes a number of braces 52 along with corresponding threaded nuts 54 as shown in FIGS. 3 and 5. The braces 52 are configured to distribute coupling and pressure loads applied to the attachment 42 of the blade track segment 26. The threaded nuts 54 engage the braces 52 to fix the braces 52 in place and to apply coupling load to the blade track segment 26 through the braces 52.

Figure 6:
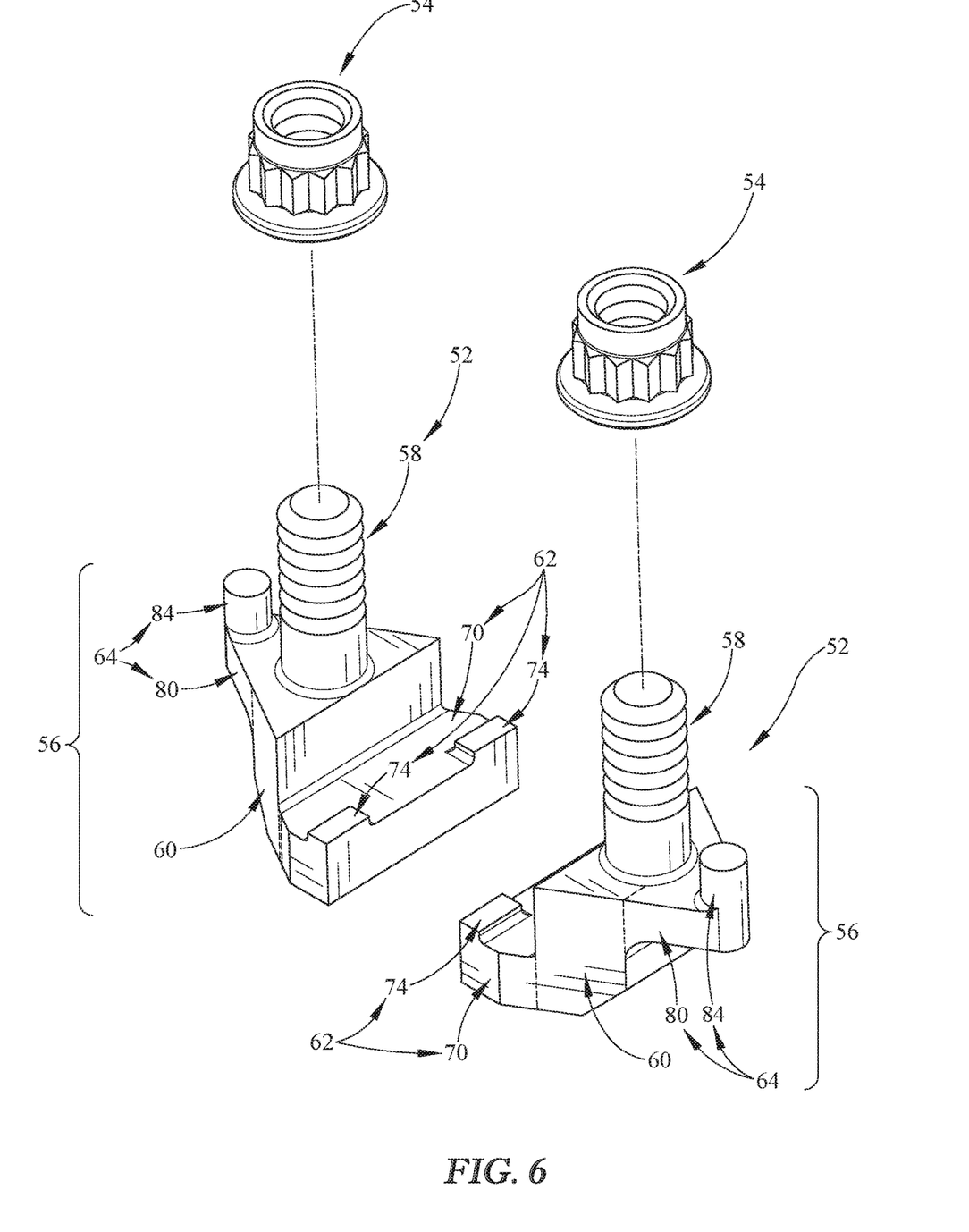
FIG. 6 is a detailed perspective view of the mounting system of FIG. 5 showing that the bracket included in each brace has two track-location arms arranged to engage the blade track segment and a load-reaction arm arranged to engage the carrier segment.

Each brace 52 is substantially similar as indicated in FIGS. 5 and 6. Each brace 52 includes a bracket 56 and a threaded attachment shaft 58. The bracket 56 engages the blade track segment 26 and the carrier segment 24 to locate and distribute mounting/pressure loads. The threaded shaft 58 of each brace 52 extends from the bracket 56 through the carrier segment 24 into a corresponding threaded nut 54.

Each bracket 56 included in a brace 52 includes a support body 60, a track-location arm 62, and a load-reaction arm 64 as shown in FIG. 6. The threaded shafts 54 and arms 62, 64 extend from support body 60. The track-location arms 62 engage the attachment 42 of the blade track segment 26 and provide rigid loading points for the blade track segment 26. The load-reaction arms 64 engage the carrier segment 24 and react against pressure and mounting loads applied to the brace 52 during use of the turbine shroud segment 22 in the engine 10.

The track-location arm 62 of each brace 52 engages the attachment 42 of the blade track segment 26 and is configured to rigidly locate the blade track segment 26 as suggested in FIGS. 3 and 4. Each track location arm 62 includes a cantilevered boom 70 and engagement pads 74 as shown in FIG. 5. The cantilevered boom 70 extends in a generally axial direction from the support body 60. The engagement pads 74 directly contact the blade track segment 26 and provide control locations for managing the orientation/placement of the blade track segment 26.

The engagement pads 74 of each track-location arm 62 extend radially outward from the cantilevered boom 70 toward the blade track segment 26 as shown in FIG. 4. The engagement pads 74 are circumferentially spaced apart from one another and are spaced apart from the support body 60. The engagement pads 74 are designed to be machined to allow for fine positioning of the blade track segment 26 relative to the carrier segment 24 when the shroud segment 22 is assembled while controlling for relatively loose shape tolerance for components of the shroud segment 22.

The load-reaction arm 64 of each brace 52 engages the metallic carrier segment 24 and is configured to carry loads associated with pressure/mounting from the brace 52 directly to the carrier segment 24 as shown in FIG. 4. By carrying these loads directly to the metallic carrier segment 24, the load-reaction arm 64 reacts a loading moment In the illustrative embodiment, the load-reaction arm 64 is located radially outward of the track-location arm 62. Each load-reaction arm 64 includes a cantilevered boom 80 and an engagement pad 84. The cantilevered boom 80 extends in a generally axial direction, opposite the track-location arm 62, from the support body 60. The engagement pad 84 directly contact the carrier segment 24 and provides another control location for managing the orientation/placement of the blade track segment 26.

The engagement pad 84 of each load-reaction arm 64 extends radially outward from the cantilevered boom 80 to the carrier segment 24 as shown in FIG. 4. The engagement pad 84 is spaced apart from the support body 60. The engagement pad 84 is designed to be machined to allow for positioning of the blade track segment 26 and to establish contact with the carrier segment 24 while controlling for relatively loose shape tolerance for components of the shroud segment 22.

It is appreciated that the use of ceramic matrix composite materials in a gas turbine engines is an area of interest. One concept for use of the material is in the ceramic matrix composite (CMC) seal segment is referred to in this paper as the I-beam design (e.g. blade track segment 26). The mechanical retention for this component can be described including two adjustable height hangers with two rigid load points that clamp the seal segment 26 to the carrier 24. The associated carrier 24 has three rigid load points that serve as the datum to position the seal segment 26 radially.

During operation, the pressure differential in the engine 10 can increase the load onto the rigid load points on the carriers 24. Designs in accordance with the present disclosure can provide an approach for distributing the pressure differential reaction load across more than two rigid load points for a CMC seal segment 26. A plurality of hangers or braces 52 are used for this purpose. Each brace 52 has an integral stud 58, two CMC load points (e.g. engagement pads 74), and a single carrier reaction load point (e.g. engagement pad 84). The carrier reaction point 84 may provide a moment balance with the CMC reaction load points 74. This can protect the stud 58 from experiencing a bending moment due to unrelenting pressure loads on the CMC (the stud 58 is loaded in tension).

The three point clamp provided by the disclosed design can allow the hanger (e.g. brace 52) to roll onto three determinate reaction points. This may accommodate a poorly controlled profile tolerance on the underside surface of the CMC seal segment 26. The multiple load points (e.g. engagement pads 74, 84) on the CMC distribute the running pressure reaction loads, and therefore can reduce the stress concentration into the relatively brittle CMC material. This configuration can therefore reduce the damaging localization of stress in the CMC component, and can allow further optimization of the CMC component design.

While the present disclosure specifically teaches the use of a mounting system in a turbine shroud having ceramic matrix composite blade track segments, it is contemplated that other assemblies may benefit from features of the specific design described. In one example, the mounting system and/or other features of the present disclosure may be incorporated into a combustor having ceramic matrix composite liner tiles that surround the combustion chamber. In another example, the mounting system and/or other features of the present disclosure may be incorporated into an exhaust assembly having ceramic matrix composite heat shields. In yet another example, the mounting system and/or other features of the present disclosure may be incorporated into heat shields for spacecraft. Moreover, the teachings of the present disclosure may be applied to any assembly facing high temperature operating conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising
a carrier segment comprising metallic materials,
a blade track segment comprising ceramic matrix composite materials, the blade track segment formed to include a runner shaped to extend partway around a central axis and an attachment portion that extends radially outward from the runner, and
a mounting system configured to couple the blade track segment to the carrier segment, the mounting system including a brace formed to include a bracket that engages the attachment portion of the blade track segment and a threaded shaft that extends from the bracket through the carrier segment to couple the blade track segment to the carrier segment,
wherein the bracket of the brace includes a support body from which the threaded shaft extends, a track-location arm that engages the attachment portion of the blade track segment and provide rigid loading points for the blade track segment, and a load-reaction arm that engages the carrier segment, the load-reaction arm arranged to carry reaction loads induced when pressure is applied to push the blade track segment radially inward during use of the turbine shroud segment in a gas turbine engine,
wherein the load-reaction arm includes a cantilevered boom, and
wherein the load-reaction arm includes an engagement pad that extends radially from the cantilevered boom of the load-reaction arm at a location spaced apart from the support body and that directly contacts a radially-inwardly facing surface of the carrier segment.

2. The turbine shroud segment of claim 1, wherein the track-location arm includes a cantilevered boom that extends axially in a first direction from the support body and the load-reaction arm extends axially in a second direction, opposite the first direction, from the support body.

3. The turbine shroud segment of claim 2, wherein the track-location arm includes a plurality of engagement pads that extend radially from the cantilevered boom of the track-location arm at a location spaced apart from the support body and that directly contact a radially-inwardly facing surface of the attachment portion of the blade track segment.

4. The turbine shroud segment of claim 3, wherein the plurality of engagement pads of the track-location arm include two circumferentially spaced apart engagement pads.

5. The turbine shroud segment of claim 1, wherein the engagement pad of the load-reaction arm is axially spaced apart from the support body.

6. The turbine shroud segment of claim 1, wherein the threaded shaft extends radially outward from the support body and the track-location arm extends axially from the support body at a location arranged radially inward of the load-reaction arm.

7. The turbine shroud segment of claim 1, wherein the mounting system includes a second brace formed to include a bracket that engages the attachment portion of the blade track segment and a threaded shaft that extends from the bracket through the carrier segment to couple the blade track segment to the carrier segment, and
wherein the bracket of the second brace includes a support body from which the threaded shaft extends, a track-location arm that engages the attachment portion of the blade track segment and provide rigid loading points for the blade track segment, and a load-reaction arm that engages the carrier segment, the load-reaction arm arranged to carry reaction loads induced when pressure is applied to push the blade track segment radially inward during use of the turbine shroud segment in a gas turbine engine.

8. The turbine shroud segment of claim 7, wherein the track-location arm included in each of the brace and the second brace has a cantilevered boom that extends axially in a first direction from the support body and wherein the load-reaction arm included in each of the brace and the second brace has a cantilevered boom that extends axially in a second direction, opposite the first direction, from the support body.

9. The turbine shroud segment of claim 7, wherein the second brace is located on an axially opposite side of the attachment portion of the blade track segment than the brace.

10. The turbine shroud segment of claim 7, wherein the threaded shaft included in each of the brace and the second brace extends radially outward from the support body, and wherein the track-location arm included in each of the brace and the second brace extends axially from the support body at a location arranged radially inward of the load-reaction arm.

11. The turbine shroud segment of claim 1, wherein the attachment portion of the blade track segment has a T-shape when viewed in the circumferential direction with a stem that extends radially outward from the runner and an attachment panel that extends radially forward and aft from the stem such that the entire blade track segment has a generally I-beam shape when viewed in the circumferential direction.

12. The turbine shroud segment of claim 11, wherein the track-location arms engage a radially-inwardly facing surface of the attachment panel included in the blade track segment.

13. A turbine shroud adapted for use in a gas turbine engine, the turbine shroud comprising
  a carrier component comprising metallic materials,
  a blade track segment comprising ceramic matrix composite materials, the blade track segment formed to include a runner shaped to extend partway around a central axis and an attachment portion that extends radially outward from the runner, and
  a mounting system configured to couple the blade track segment to the carrier component, the mounting system including a plurality of braces configured to be located on axially opposite sides of the attachment portion, and a plurality of threaded nuts engaged with the braces, each brace including a threaded shaft that extends through the carrier component, a track-location arm that extends axially forward or aft of the threaded shaft and engages the attachment portion of the blade track segment, and a load-reaction arm that extends axially forward or aft of the threaded shaft, opposite of the track-location arm, and engages the carrier component,
  wherein the track-location arm includes a cantilevered boom that extends from a support body included in the brace and a plurality of engagement pads that extend radially outward from the cantilevered boom of the track-location arm into direct contact with the blade track segment.

14. The turbine shroud of claim 13, wherein the plurality of engagement pads included in the track-location arm includes two circumferentially spaced apart pads.

15. The turbine shroud of claim 13, wherein the attachment portion of the blade track segment has a T-shape when viewed in the circumferential direction with a stem that extends radially outward from the runner and an attachment panel that extends radially forward and aft from the stem such that the entire blade track segment has a generally I-beam shape when viewed in the circumferential direction.

16. The turbine shroud of claim 15, wherein the track-location arms engage a radially-inwardly facing surface of the attachment panel included in the blade track segment.

17. The turbine shroud of claim 15, wherein some of the plurality of braces are located along an axially forward side of the attachment panel included in the attachment portion of the blade track segment and some of the plurality of braces are located along an axially aft side of the attachment panel included in the attachment portion of the blade track segment.

18. An assembly comprising
  a carrier component comprising metallic materials,
  a supported component comprising ceramic matrix composite materials, the supported component formed to include a shield portion adapted to face a hot environment when the assembly is in use and an attachment portion that extends from the shield portion, and
  a mounting system configured to couple the supported component to the carrier component, the mounting system including a plurality of braces configured to be located on axially opposite sides of the attachment portion and a plurality of threaded nuts engaged with the braces, each brace including a threaded shaft that extends through the carrier component, a track-location arm that engages the attachment portion of the supported component, and a load-reaction arm that engages the carrier component,
  wherein the track-location arm includes a cantilevered boom that extends from a support body included in the brace and a plurality of engagement pads that extend radially outward from the cantilevered boom of the track-location arm into direct contact with the supported component.

* * * * *